Feb. 6, 1962 J. J. HORAN 3,020,437
ELASTIC LAMPS, PRINCIPLES, CONSTRUCTIONS, MOUNTINGS AND METHODS
Filed Feb. 9, 1959 4 Sheets-Sheet 1
Fig. 2
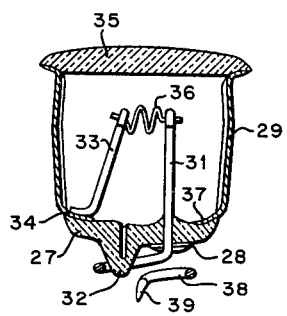
Fig. 5  Fig. 5a
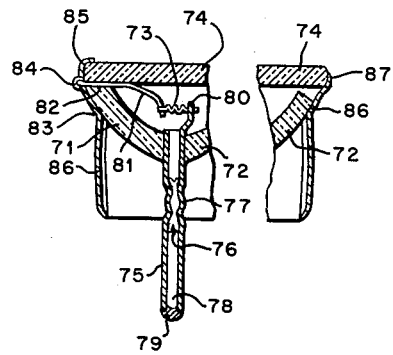
Fig. 4
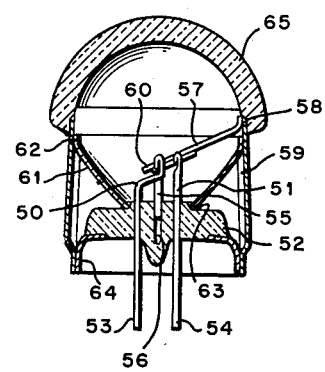
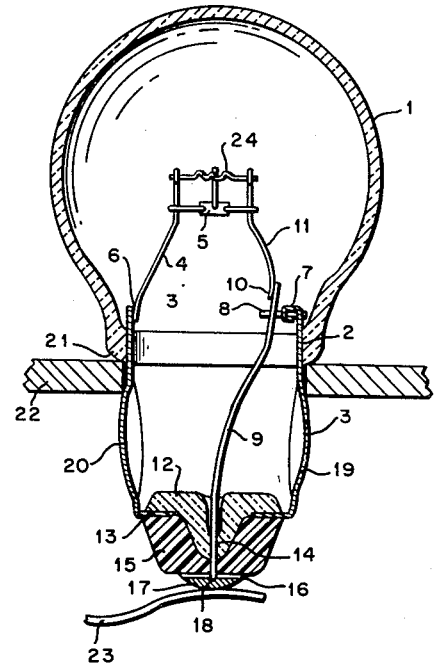
Fig. 1
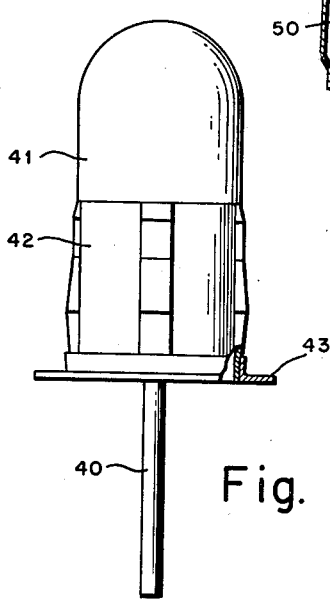
Fig. 3

Feb. 6, 1962  J. J. HORAN  3,020,437
ELASTIC LAMPS, PRINCIPLES, CONSTRUCTIONS, MOUNTINGS AND METHODS
Filed Feb. 9, 1959  4 Sheets-Sheet 2
Fig. 6
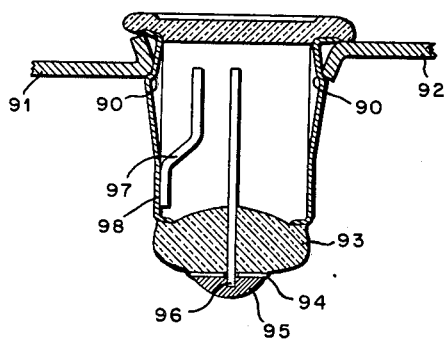
Fig. 7
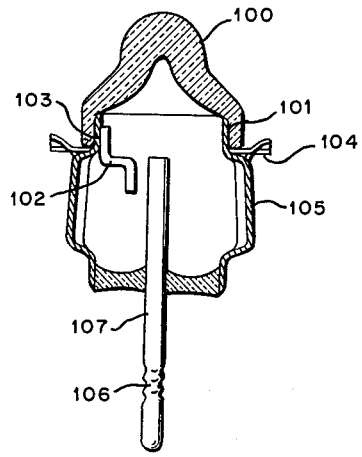
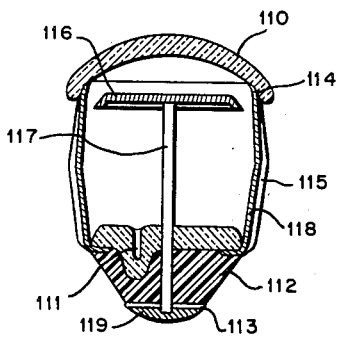
Fig. 8
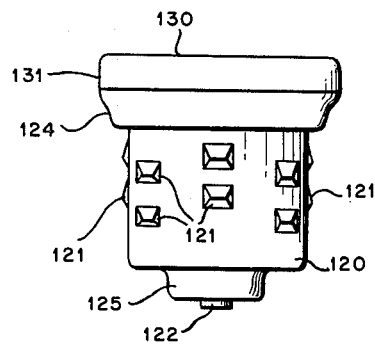
Fig. 9
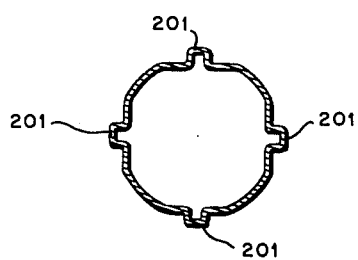
Fig. 10

Feb. 6, 1962 J. J. HORAN 3,020,437
ELASTIC LAMPS, PRINCIPLES, CONSTRUCTIONS, MOUNTINGS AND METHODS
Filed Feb. 9, 1959 4 Sheets-Sheet 3
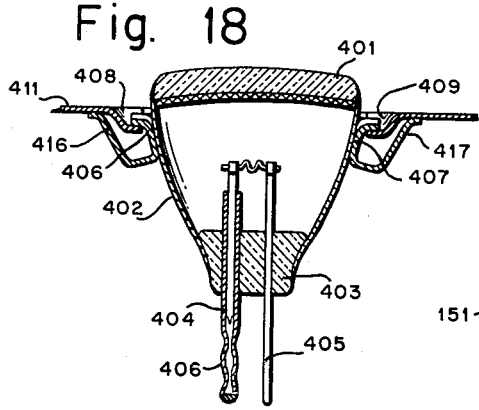
Fig. 18
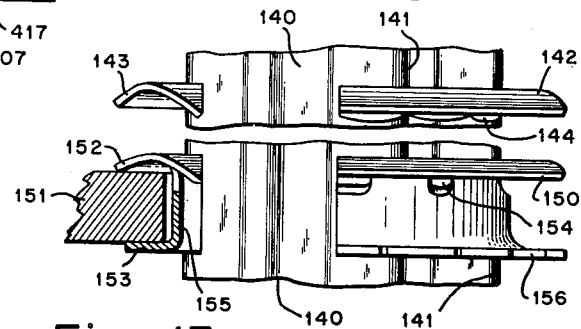
Fig. 12
Fig. 13
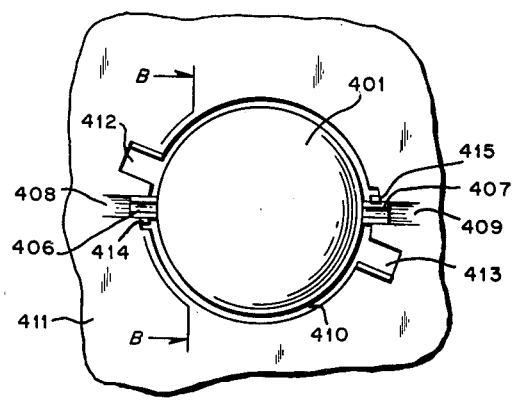
Fig. 19
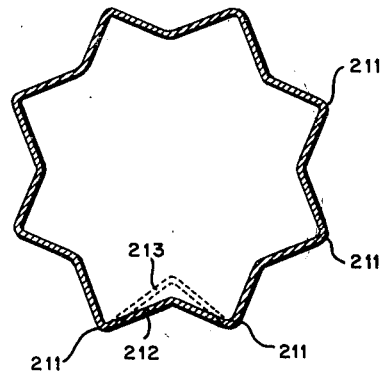
Fig. 11
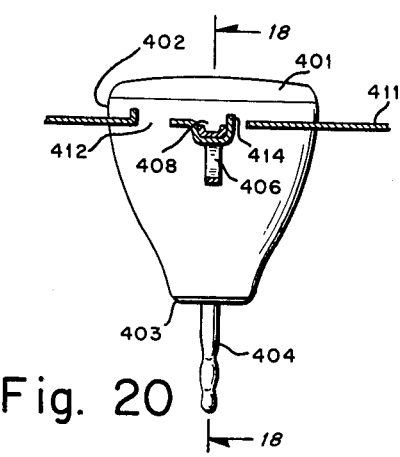
Fig. 20
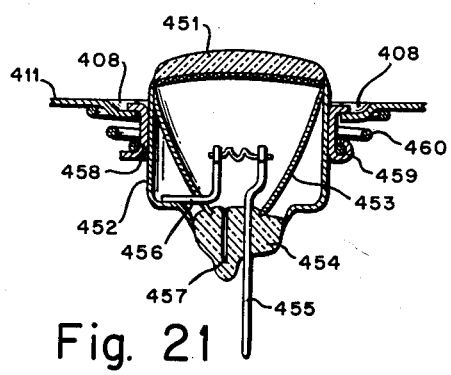
Fig. 21

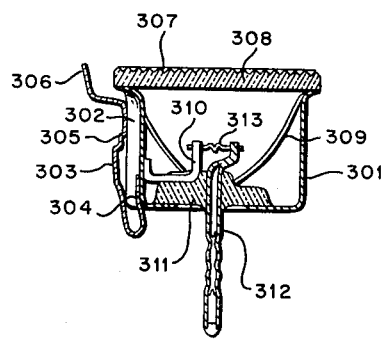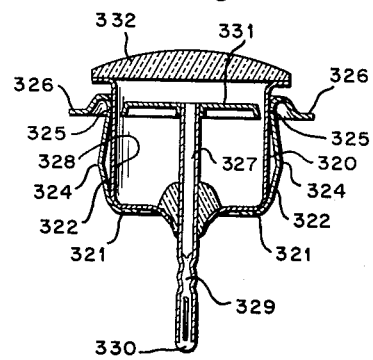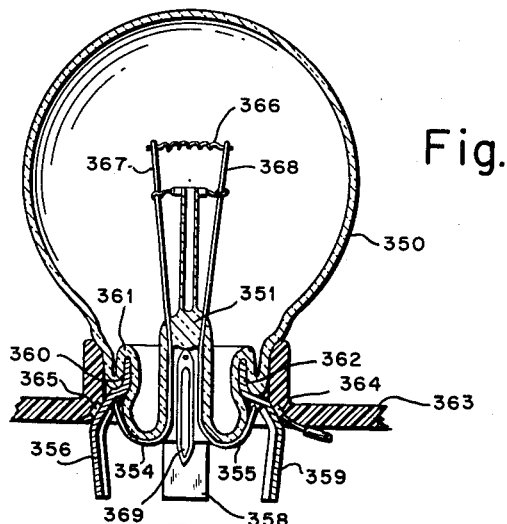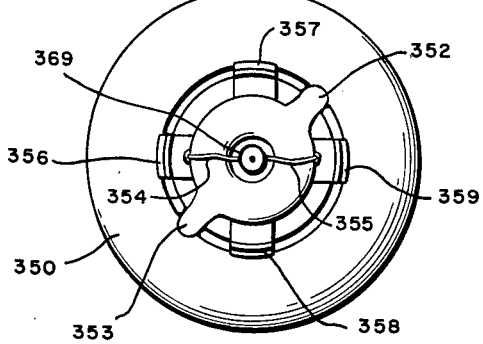

United States Patent Office 3,020,437
Patented Feb. 6, 1962

3,020,437
ELASTIC LAMPS, PRINCIPLES, CONSTRUCTIONS, MOUNTINGS AND METHODS
John J. Horan, 420 Quigley Ave., Willow Grove, Pa.
Filed Feb. 9, 1959, Ser. No. 791,907
18 Claims. (Cl. 313—318)

This invention relates to a basically new philosophy in the design of electric lighting devices and devices of related function and/or construction.

From the earliest days of the art, glass was the obvious material of construction because of its transparency and susceptibility to heat sealing of vacuums and special atmospheres. Electric lamps have therefore been classed as rigid, non-ductile and delicate, with considerable effort being devoted to glass technology to reduce its limitations.

Because of the physical properties of glass, because of the characteristics which design habit has invested in the electric lamp, and because of the generally poor dimensional control available in glass production items, it has been assumed to be necessary to provide metallic bases for lamps.

A lamp base is little more than a bulky end adapter, used for the purpose of making a delicate and hard-to-standardize glass device fit a narrow dimensional code. No less than the glass enclosure itself, however, the design of bases has suffered from the philisophy that has long since assumed that a lamp requires a cradled accommodation. Bases are packed with glue, cement, plaster and/or plastic, denying the application even the slight inherent ductility native to the metal itself.

Besides the bulb that must dwarf the tiny filament because of the poor thermal conductivity of glass, and the separate stuffed base, there is also required a socket or receptacle with many component parts to compound the penalties of bulk and complexity. Where adequate room for the proper socket, etc., is lacking, the sizes of all three: bulb, base and socket, are pared, often decreasing quality while adding to cost. Sockets, of course, are sometimes omitted entirely, the bulb being secured by a sheet metal clamp or by its "pigtail"; and a few short lived attempts have been made to eliminate bases by electroplating metal on to a threaded glass enclosure. The compliance to permit insertion or removal is placed in the socket and is achieved by the wedging action of the thread or by the use of contact springs, etc., therein, which add to cost and bulk of the installation and often fail to assure reliability.

The most often used types of bases include the threaded or "Edison" type, applicable to non-mobile and non-vibrating installations, and the bayonet types. Pronged bases have been suggested for adapting to the common wall outlet but have not been practical enough to find public favor. The pin type bases have been used for multielement vacuum and gas tubes. In the latter two cases there is a suggestion of resilience, or at least of end flexure; but it is long accepted practice to rely on the receptacle for the floating contact or compliance function. A few isolated suggestions have been made to provide a flexible or adjustable element between the base and the energy translation element, primarily for focusing purposes.

Vacuum chamber walls for energy translation devices have often been made of metal, the best known being electron tubes, including cathode ray tubes, the end enclosures of fluorescent lamps, etc. However, while some resilience may have been inherent in the metal, compliance with holding devices was not intended or achieved.

In my invention, unnecessary length and bulk in the lamp itself are eliminated and the overall number of components and fabrication operations are reduced to the minimum required for function. The lamps are provided with resilient metal components which provide the necessary adaptability to mate with rigid metal openings. In most of my embodiments the cavity wall itself is elastic. These walls are provided with windows and with insulating seals of vitreous or ceramic material for electrical leads; but only a single wire lead per filament is required as long as the wall itself may be maintained at ground potential, the usual case when the lamp is a light source. A lens, plate, bulb, hemisphere, meniscus, drop, bubble, or otherwise configured window emits the light. These lamps are generally a simple push fit into a non-resilient opening.

A second group or species of embodiments under this concept utilizes an extended portion of a metal enclosure, or a metal device gripping or bonded to a glass enclosure, as a resilient member, again providing a simple push fit into a non-compliant or not essentially compliant opening in a receptacle or panel.

In another group of embodiments, metal again serves as an enclosure material, but the special atmosphere chamber wall itself is not intended to provide the primary resilience. The resilience is provided by one or more members either continuous with or welded directly to a portion of the enclosure material. Instead of being an extension or a welded-on piece, the resilient member may be entrapped or gripped in a flange or extension of the body of the enclosure, though this latter method is seldom to be preferred.

This group divides into two sub-species, in one of which the resilient member (or members) serves as a latch. In the other, which is intended primarily as a theft frustrating class, but also as an instrument indication class, the normally resilient member of the lamp assembly serves primarily as a spring, assuring a well grounded fit into a panel opening.

From the days when electric lamps were first used in automobiles, it has been necessary to make special arrangements to protect those which are used for exterior signals and lighting and to provide bulky reflectors for them. Automotive styling trends have recently exaggerated the protective means, to the degree that sound and harmonious styling has been submerged in favor of extremely costly and garish over-accentuation of the external lighting means.

In this invention I provide means for reversing present trends at great savings in cost, and with improvement in functional design and appearance.

Since the lamps of my invention are adapted for self incorporation of both lenses and reflectors, their front surfaces may be left uncovered, even for external vehicular lighting. In fact, the last mentioned theft resistant class is especially intended for such lighting. To avoid the possibility of mischievous removal from vehicles, they are designed to be inserted outwardly through openings accessible from interior spaces, such as under the hood and trunk cover, in the wheel wells, and even in the passenger compartment. The lamp employs a form of bayonet latching means that locks it to the mounting opening with the lens in the preferred position, barely protruding from the panel, with insufficient cylindrical grasping surface to permit it to be disconnected by hand from outside. Members to be described prevent the bulbs from being removed intact from the opening, even by means of a pry tool. I prefer but do not insist that these unique lamps be spring engaged to the mounting panel by means of springs mounted on the lamps themselves.

These several species are not considered as direct equivalents. Although all are expressions of this broad new concept, and all come under the generic claims, they do not share all attributes in common, nor would all of them necessarily be interchangeable with optimum performance in a given application. As stated, one object of this invention is to provide mounting compliance in the lamp itself.

Another object is to eliminate the necessity for use of special sockets, receptacles, etc. for accommodating lamps and other energy translation devices, while permitting said use in most cases if desired.

An object is to permit the insertion of the bodies of devices in accordance with this invention into plain drilled or pierced holes in either resilient or rigid material, and to provide a gripping force inherent in their own resilience.

An object is to provide an axial force component, in addition to friction, for holding lamps of this invention within holes or sockets in which they are mounted.

An object of this invention is to provide lamps of reduced length, diameter and included volume.

An object of this invention is to improve electrical contact in lamps.

An object of this invention is to increase the efficiency of heat removal when necessary for optimum performance and life of the lamps.

An object of this invention is to enable much closer area grouping of lamps, particularly when they are used in multiple as indicators.

An object of this invention is to reduce not only the cost of lamp installations but also the cost of the lamp itself.

An object of this invention is to provide simple low-cost lamps requiring no separate lenses, covers, holders, reflectors, enclosures, sockets, gaskets, or the like for exterior vehicular lighting, as in turn indicators, tail lights, etc.

An object of this invention is to provide external vehicular lamps which will be theft resistant and, even if removed, valueless to the thief.

An object of this invention is to provide external lamps accessible without tools from spaces within a vehicle.

Further objects and novel features of my invention will become apparent in the balance of the specification, in the claims appended, in the drawings and in the following description of the several forms thereof as shown in the drawings in which FIG. 1 is a sectional view of an embodiment of one form of this invention;

FIG. 2 is a sectional view of an embodiment of another form of this invention;

FIG. 3 is a view of an embodiment of a third form of this invention;

FIG. 4 is a sectional view of an embodiment of a fourth form of this invention;

FIG. 5 is a view of an embodiment of a fifth form of this invention;

FIG. 5a is a fragmentary view of a construction alternative to that of FIG. 5;

FIG. 6 is a sectional view of an embodiment of a sixth form of this invention;

FIG. 7 is a sectional view of an embodiment of a seventh form of this invention;

FIG. 8 is a sectional view of an embodiment of an eighth form of this invention;

FIG. 9 is an overall view of an embodiment of a ninth form of this invention;

FIG. 10 is a diametral cross section tthrough the resilient base applicable to various forms of this invention;

FIG. 11 is a diametral cross section through the resilient base applicable to various forms of this invention;

FIG. 12 is a partly cutaway view of a retaining ring or contact ring such as might optionally in certain instances be used if desired with various forms of this invention, particularly when the lamp is inserted into a hole in an insulating panel;

FIG. 13 is a partly cutaway view of a ferrule such as might optionally in certain instances be used if desired with various forms of this invention;

FIG. 14 is a sectional view of an embodiment of a tenth form of this invention;

FIG. 15 is an end view of the embodiment shown in FIG. 14;

FIG. 16 is a cross section of an embodiment of an eleventh form of this invention;

FIG. 17 is a sectional view of an eleventh form of my invention;

FIG. 18 is a sectional view of a twelfth form of this invention;

FIG. 19 is a sectional view of a thirteenth form of this invention;

FIG. 20 is an end view showing the lamp of FIG. 18 protruding from a suitable panel opening designed to receive the lamps of my invention;

FIG. 21 is an arcuate section of the panel of FIG. 20 which also contains a view of the embodiment shown in FIG. 18.

Referring now to FIGURE 1, there is shown a lamp comprising a spherical glass portion 1 heat sealed 2 over the upper portion of a thin metal base 3. One terminal 4 of the mount assembly 5 is spotwelded 6 to the base 3 to provide a ground connection. Diametrically opposite the spotweld 6, a tab 7 projecting from above the base 3 is bent over to lock in a ceramic standoff 8, having a hole through which the live electrode 9 passes, said live electrode 9 being spotwelded 10 to the second terminal 11 of the mount assembly 5 which supports the filament. The live electrode 9 passes downward through the sealing button 12 which was heat sealed to the flange 13 of the base 3 prior to assembly of the mount 5 and the spherical portion 1. Following assembly of the above named items, the tip off tube component of the sealing button 12 had been evacuated and heat sealed at 14 to the live electrode. Plastic spacer 15 is either molded or cemented in place following the last named heat sealing operation 14. A thin metal washer 16, its lower surface tinned, may have been integrally molded upon or bonded to spacer 15. A drop 17 of solder applied to the sheared terminus 18 of the live electrode 9 bonds the terminus to the washer 16 and provides an external contact surface for contact arm 23.

Referring momentarily to FIGS. 10 and 11, while FIG. 1 is still under consideration, there are shown two of the many diametral cross section configurations which may be applied to the resilient portion 19 of the base 3. (Other potential designs, incidentally, are shown elsewhere, as in FIG. 9; but FIG. 9 does not agree with FIG. 1.) When radial pressure is applied at any of the salient points, 201 in FIGURE 10, 211 in FIGURE 11, the very thin walled material will yield inwardly. The wall material between the salient points may be described as re-entrant. When pressure is applied simultaneously at all of the salient points, 201 in FIG. 10, bending in the material occurs between these salient points 201, permitting them to enter a hole smaller than their relaxed diameter without exceeding the elastic limit of the material. When pressure is applied to all of the salient points, 211 in FIG. 11, the deformation appears to result in a relative change between the value of the right angles and their supplements, the latter appearing to increase at the expense of the former, although the actual change is more complex and involves bending of the straight sections between adajcent angles. Under such pressure the circumscribed circle around the joints becomes elastically smaller.

Therefore as the elastic portion 19 of the base in FIG. 1 is first inserted into a hole having a diameter smaller than the maximum circumscribed circle, not only will frictional resistance be encountered, but there will also be a spring force tending to build up as the base is advanced to the high region 20. Beyond this region 20 the spring force component actually assists in counterbalancing the frictional resistance until the lower edge 20 of the glass sphere 1 encounters the panel 22 when the lamp has been advanced into the hole as far as it will go. It will then be noted that the spring force is now biased so as to resist withdrawal of the lamp from the hole. Provided that the panel is of metal, ground electrical potential is available to the base and therefore to the filament from the moment that insertion begins, as in conventional installations. The forcible wiping of the salient points against the interior surface of the hole assures a good electrical ground contact and the direct metal to metal contact assures an efficient path for excess heat generated during lamp operation. In section views through axes, fluting other than at the sectional edges themselves has been omitted for clarity.

The solder contact 17 at the base of the bulb must, as in conventional installations, meet a resilient live contact, which may be no more than a spring finger 23 anchored at any convenient point. The axial force applied by this finger should preferably be less than the opposite axial force applied by the resilient fit of the base 3 in the hole in the panel 22.

Referring now to FIG. 2, while the overall appearance is different, this embodiment has much in common with FIG. 1. It too might have base diametral cross section configurations including salient or jutting portions and reentrant portions like those of FIGS. 10 and 11, or others that may be readily visualized.

It will be seen that the live electrode 31 has been moved off center, and that it has no intermediate support within the very short envelope. It will also be seen that the tip off seal 32 is separated from the live electrode 31, that the ground electrode 33 is now welded to the lower end of the base 34 and that the filament 36 is merely gripped and welded in place to the ends of the two electrodes instead of having been pre-assembled to a separate mount. This simple lamp has a disc shaped front window 35 through which light is emitted. Some improvement in illumination performance will be obtained if interior metal surfaces have been bright-metal plated or pre-coated with vaporized aluminum. When vaporizing is performed in situ, it is well to provide a stop coating around the live electrode to prevent current flow other than via the filament. Feathering the edge 37 of the metal at the glass seal reduces the incidence of failure due to glass stresses and permits selection of cheaper glasses and metals. The live electrode 31 terminates after-protrusion from the seal 27 in a coiled spring 38 having a barbed tip 39.

This construction, therefore, provides compliance, not only in the wall 29 of the chamber which is adapted to position the bulb in a simple hole, but also with respect to the live contact, the barb 39. This last feature makes this design especially valuable for outdoor use, for flashlights and for vehicles, since corrosion of flattened abutting surfaces at this point often prevents passage of current. Moreover, use of the coil spring feature eliminates need for providing other spring means in a flashlight or other holder to keep the contacts engaged. Furthermore, failure of the spring terminal, even if it occurred, would involve only replacement of the lamp, not the discarding of the flashlight or other devices. Detail 28 is a washer of metal alloy heat sealable to the glass seal 27, its external face being joined to the coil spring 38 by solder. The purpose of this device is to reduce stress concentration upon the glass seal 27 due to flexing of the spring 38. Again, of course, those familiar with the art will recognize the extreme simplicity of the lamp as compared with those in current use.

Referring now to the embodiment shown in FIG. 3, the principal change here, aside from the use of a pin contact 40 for the live electrode, which will be discussed in greater detail in connection with other embodiments, is that the forward or window portion 41 is smaller in diameter than the base 42. This feature permits insertion of the bulb from the side of a panel opposite that where the illumination is desired. A ring channel 43, or almost any suitable protrusion from the lower end of the base 42, provides an insertion stop. The ring channel 43 may be welded or soldered in place on the base 42; or, alternatively, a stop could have been flanged outwardly from the lower end of the base 42. After the lamp is inserted, a spring terminal crimped to the end of a live wire may be slipped over the pin contact 40.

Referring now to FIG. 4, there is shown an embodiment especially suited for vehicular lighting purposes, particularly for back-up lights, stop lights, parking lights, directional signals, etc. Although of the two filament type, it will be obvious that single filament versions can be made which will be even more simple. The reflector 61, made of aluminum foil or other thin bright material, may either be tack welded at its periphery 62 to the base or it may be anchored to the sealing button 52 by a deposit 63 of very low melting point glass.

Two heat sealed electrodes, 50, 51 lead out through the vitreous sealing button 52 to provide pin contacts 53, 54. These short electrodes terminate inside the lamp in conventional bent-over tips which in this view hide the filaments behind them. Stabilizing pin 55 is also heat-bonded in the tip-off hole in the button 52; but it has no leadout at this point. Being of rectangular cross section, the stabilizing pin 55 does not fill the tip-off hole 56 in the button 52. Ground arm 57, welded 58 to the upper end of the base 59, carries the return current to the base 59. It is tack-welded to the offset arm 60 of the stabilizing pin 55 after the filament terminals have first been welded to the offset arm 60, thus it serves also as a retainer for those filament terminals.

In the construction employed here, the base is not of one piece. A cup 64 has been soldered at the bottom periphery of the resilient component 59, and the button 52 is heat sealed to this cup 64. A hemispherical window 65 is heat sealed over the upper end of the base prior to evacuating and sealing the tip-off 56. This tiny and relatively simple assembly, capable of complete or almost complete automation, would greatly reduce the cost of exterior lighting in automobiles. It is hardly necessary to point out to those skilled in the art that the window 65 can be replaced with a colored, Fresnel-type window smaller in diameter than the base. If such units were then inserted from inside a vehicle through openings in the sheet metal, they could replace completely, insofar as function is concerned, all such complex and bulky auxiliary external lighting assemblies as are now in use.

Referring now to FIGS. 5 and 5a, there is seen a single-filament 73 reflector-type lamp. The sections to the right and left of the center line portray mutual departures in construction. The cup, 71, 72 is a parabola shaped glass, silvered on its concave face. The silver (or other bright coating) is electrically discontinuous adjacent the live electrode 75. The live electrode 75 is a metal tube which in this embodiment serves also as the tip-off seal. A thin tube or coating 76, of low melting point metal, lines the tube at 77. The tube 75 is heated in this zone 77 until the lining 76 is ready to flow, while the tube 75 is under a vacuum applied at its remote terminus 78. The tube 75 is then crimped at 77, sealing it. Dipping the terminus 78 in solder (or even plastic) provides a smoothly rounded tip 79.

The tubular live electrode 75 is partially sheared at its upper end, leaving a small projection 80 to which the filament 70 is welded. The opposite end of the filament is welded to the tip of the ground arm 81 which passes along a tiny groove 82 in the upper edge of the cup 71 extending through a hole in the base 83, and being soldered in place at 84. (Alternatively it might have been welded to the inner surface of the base.) The glass cup 72 may be circumferentially heat sealed to the base as at 86. The window 74 may also be heat sealed to the base as at 87 around the entire periphery of the window 74. As shown on the right side of the section, sealing in this manner would be sufficient as long as the tube is tipped off. However, it will also be clear from the left side of the figure that an alternative bond of the cup 71 to the window 74 can be made by permitting them to flow slightly and be heat sealed together, provided that ground arm 81 is of thin material and the slot in which it fits is shallow. A low melting point glass powder applied in the area of the ground arm 81 will sometimes be helpful in assuring the seal. In the event that the seal is from glass cup 71 to glass window 74 as latterly described, instead of from glass cup to base to glass cup as formerly described, the base 83 does not need to be sealed to the glass component 71, 74; but may merely be crimped over as at 85. The elastic portion 86 of the base 83 is similar to the elastic portions shown in previous embodiments except that in this instance it does not itself form part of the sealed chamber.

Referring now to FIG. 6, there is shown a lamp of the glow type employing a gas such as neon and having no filament. It may be seen that the wall of this lamp has a slightly concave external curvature in the area designated by the numeral 90. Such a curvature is particularly useful in vibratory services for holding the lamp in place, provided that the thickness of all panels, 91, 92 or of the dimpling of the holes in the panels can be standardized. Obviously, for extra thick panels, a single circumferential curvature would not exert a suitable grip; but for all panels that do not exceed relative panel thicknesses shown, the grip would be superior. The conventionally adapted lower portion consists only of the insulating button 93, the washer 94, made of glass-sealing metal and having its external surface tinned, and the "solder drop" 95, which mechanically and electrically bonds the sheared end 96 of the live electrode to the washer 94. Alternatively, the live electrode might have been combined with the washer by an upset heading operation. The ground arm 97 itself constitutes one electrode, it having been welded at 98 below the elastic portion of the base.

No tip-off is shown, the purpose being to underline the fact that lamps of this invention might be sealed in vacuum or gas filled chambers without tip-off operations.

Referring now to FIG. 7, there is shown another gas filled glow lamp, in which the window 100 itself constitutes a tip-off tube, it being shrunken and sealed in place over the upper end of the base at 101. The ground arm 102, which constitutes one electrode, is welded to the base above the elastic portion at 103. Stop 104 is a ring secured above the elastic portion of the base 105 and having alternate high and low segments to facilitate removal from a panel. The series of indentations 106 on the center electrode and contact pin 107 are provided for the purpose of achieving maximum security of wire spring terminals when slipped over the pin 107.

Referring now to FIG. 8, there is shown a third gas glow lamp generally resembling FIG. 6 except for the shape of the end window 110, the presence of a tip-off tube 111, the inclusion of a plastic spacer 112 to which the washer 113 is adhesively bonded and tipped with solder 119, and a T-shaped center electrode consisting of a disc 116 and a stem 117. This wide center electrode permits the outside wall 118 itself to serve as the ground electrode. Varying effects can be achieved, depending whether the disc 116 of the T is opposite the smooth cylindrical portion 114, of the wall as shown or whether it is moved lower to permit the fluting 115 of the most resilient section to exert maximum influence on the shape of the glow.

Referring now to FIG. 9, there is shown the exterior of a lamp having a cup shaped metal body 120 embossed 121 with a nutmeg grater type of resilient wall design. This type of wall is especially suitable where diametral tolerances of panel holes can be closely held but panel thicknesses can not. It is also suitable when the panel is of light gauge material and when the hole periphery is also somewhat resilient by design. The normal window face 130 of the glass cover 124 is rendered opaque by outside silvering. All light, therefore, must pass laterally out of cylindrical surface 131, this feature, therefore, so readily incorporated into various lamps of my invention, rendering the lamp most suitable for edge lighting of panels. Electrode 122 is insulated from body 120 by the vitreous button 125.

Referring again to FIG. 11 and also to FIG. 12, there is shown in FIG. 12 a partially sectioned view of one form of a retainer washer optionally usable with lamps of this invention, particularly when the lamp must pass through plastic or other panels that are non-conductors of electricity. The area denoted by numerals, 140, 141 represents a fragmentary view of the fluted base of one of the lamps of this invention. To the right of the centerline is seen a view of the washer 142 as it appears in place on the lamp. The extreme left of the figure is a section 143 through the washer 142 itself, one quarter of it having been removed. Returning to the right side and below the peripheral portion of the washer 142 may be seen the scalloped interior edges 144 designed to follow closely the fluting 140, 141 of the lamp base. The effect of the scalloped inward portion of the washer, which is optional, is to permit use of thinner material in the washer or, alternatively, to prevent withdrawal of the lamp if such is desired. A satisfactory retaining washer can, of course, be made with a plain center having no scallops. Again, depending on the dimensions and physical properties of the washer material, it may have a single radial slit to facilitate assembly and removal. The washer would normally have a ground or return lead soldered to it at any preferred point.

Referring now to FIG. 13, there is again shown a fragmentary view of the exterior fluting 140, 141 of a lamp in accordance with FIG. 11 of this invention. A plastic panel, shown in phantom section 151 (or a metallic panel having an oversize hole previously intended to receive sockets such as have existed in the art) has crimped thereto an adapter receptacle 150 intended to receive lamps of this invention. The upper portion 152 of this adapter receptacle is generally similar to the retainer washer shown previously in FIG. 12, even to the optional scallops 154. The optional scallops 154, however, have in this instance been pierced inwardly from the downwardly depending wall 155 of the adapter receptacle. From this wall 155, the slit flange, shown in section 153 and in elevation 156, is bent over in place to secure the adapter receptacle in place permanently against removal from the hole in the panel 151. Again a ground or return lead may be soldered to any convenient point on the adapter receptacle.

Referring now to FIGS. 14 and 15, there is shown a body 350 for a filament 366 lamp of generally spherical configuration having a mount 351 and tip-off 369 of conventional construction. The lamp body departs from the conventional in that it is adapted to function with a resilient base instead of the conventional rigid type. It further departs from the conventional in that the usual center contact for the live electrode has been eliminated. Such a contact could obviously have been provided; but it is desired here to teach another departure from the conventional.

It will be seen that the wires 354, 355 leading from electrodes 367, 368, as they pass through the mount, are joined to the prongs 356, 359 respectively. Prong 356 and prong 357 are extensions of a half ring 360 imprisoned in the fold 361 of the body 350. Likewise prongs 358, 359 are extensions of half ring 362. The half rings are separated and insulated from each other by gas projections 352, 353 constituting part of the lamp body 350. Alternatively, of course, the metal half rings and prongs might have been molded or cast into a metal-plastic assembly, in which case the projections would have been plastic.

The projections constitute keys which prevent insertion of the lamp incorrectly into a receptacle such as 363. The receptacle 363 would normally contain two contact strips 364, 365 to mate with prongs 356 and 359 respectively, providing both electrical contact and mechanical security. It may be noted that the receptacle as shown is much safer than conventional sockets in that the contact strips are not visible and not easily reachable from outside the receptacle when the latter is empty, and furthermore that the prongs cannot become electrically alive until entrance of the lamp into the receptacle has progressed to the degree that it is impossible to make finger contact with the prongs.

Referring now to FIG. 16, there is shown a filament type lamp comprising a base 301, which may in this instance be rigid. The base 301 contains one or more grooves 302 which may be described as reentrant portions parallel to its axis. Each groove 302 provides a working recess for a spring latch 303, one end of which is welded at 304 to the wall of said groove 302. The spring latch 303 has a series of small steps 305 to aid in retaining the lamp in a hole having a diameter only slightly larger than the outside diameter of the base 301 itself. Squeezing the upward projection 306 above the steps 305 of the latch 303 permits the lamp to be lifted from a hole with no restraint.

Other noteworthy features of this design include the knurled front face 307 of the window 308 which is heat sealed to the base 301, the reflector 309 and the mount. As in the filament lamps described previously in connection with FIG. 4, the entire internal assembly or mount, including the glass button 311, the center electrode 312, and the ground electrode 310 may be fabricated as a unit prior to insertion in the base 301, the only internal operation thereafter required being the welding of the end of the ground or return lead 310 to the interior of the base 301.

This lead 310 has preferably been tacked by means of low melting point glass powder in place on the insulating glass button 311, as part of the mount assembly. As in the previous instance the reflector 309 may:

a. Have been tacked to the button 311 with low melting point glass powder
b. Be merely fitted or trapped in place, or
c. Be welded at its upper periphery to the internal wall of the base at from one to three points, depending on its weight, stiffness, etc.

This live electrode is similar to that previously described in connection with FIG. 5.

Referring now to FIG. 17, there is shown a cylindrical base 320 having welded to the underside thereof the end or ends 321, of one or more, preferably at least two, grippers 322 which are tapered spring members that resiliently bear against the sides of a panel hole into which they may be inserted, resisting entry until salient points 324 have been passed, after which they favor retention. These grippers 322 have upper ends 325 that bear against the walls of the base 320 for additional spring force support. The grippers terminate in tips 326 which serve as stops to prevent overtravel upon completion of insertion.

The lamp shown here is of the gas filled glow type having a meniscus shaped lens 332, the center electrode being a disc 331 with a hollow stem 327, and the interior wall 328 of the base 320 serving as the return electrode. The lower half of the T stem has been lined with low melting point metal 329, the internal atmosphere being regulated through the hollow stem prior to a heat crimp sealing operation which causes some of the metal to flow through the terminus where it hardens as a bead 330.

Referring now to FIGS. 18, 19 and 20, there is shown a lamp comprising a lens 401, a parabolic reflector body 402 sealed to said lens, and a sealing button 403 serving also as a mount in that it serves to position the electrodes 404, 405. In this particular single filament construction, both electrodes are of the pin type, one 404 being hollow and lined at the lower end with low melting point material 406 which is heat sealed by crimping as the final step in the tip-off operation. Alternatively the pin electrode 405 might have been welded to the body 402 inside the lamp. The reflector body 402 has, welded on externally thereto, two detent-spring members 406, 407 which accomplish several purposes. The upper ends of these spring detent members 406, 407 serve as bayonet type latches which lie in the grooves 408, 409 flanking the circular portion 410 of the cutout of panel 411, designed to receive the lamps of my invention.

To engage the spring detent members 406, 407 in the grooves 408, 409, the bulb must first be inserted beyond its normal engagement length with the spring detent members 406, 407 aligned with the notches 412, 413, following which a slight turning motion aligns the spring detent members with the grooves 408, 409. Over-travel in the rotational operation is prevented by the upwardly bent stops 414, 415 notched out of the metal adjacent the grooves 408, 409.

The lower ends of the spring detent members 406, 407 are looped around upwardly to serve as spring fingers 416, 417, which, reactively biased against the panel 411, hold the bulb firmly downward with the upper ends of the spring-detent members 406, 407 securely seated in the grooves.

Since the amount of projection of the lens 411 above the panel is small, the bulb cannot practicably be seized and unlocked from outside. Even if it could be unlocked by use of a special tool (a screwdriver is all that is needed to remove most present lenses for access to the bulbs), the bulb would spring back within the vehicle, foiling theft. Even if means could be provided to retain the bulb against springing back, it could not be pried outwardly without overstressing the spring detent members 406, 407, thus rendering the lamp useless to the thief.

The pins 404, 405 may be engaged either to a small slip-on twin terminal or by "banana" plug type terminals on the ends of the connecting wires. Terminals for live electrodes will preferably have sleeve type insulation.

Referring now to FIG. 21, there is shown a lamp comprising a lens 451, a cylindrical body 452, an internal reflector 453, a sealing button 454 and electrodes 455, 456. Live electrode 455 terminates as a pin, but ground electrode 456 is welded to the inside of the body 452, which thereby becomes the ground return. The final seal is performed by means of tip-off 457.

Latch members 458, 459 are welded to opposite sides of the body; and their upper ends lie in the grooves 408, 409 of the panel 411 in exactly the same manner as did the ends of the spring detents in FIGS. 18, 19 and 20. Optionally, of course, the latch members might have been formed of a single flanged cylindrical member appropriately cut away at the top to permit entry via the notches 412, 413. In fact it is possible with some added complexity of fabrication to make the body 452 and the latches 458, 459 out of a single metal cylinder appropriately flanged.

In this embodiment, the biasing spring 460 which provides the necessary compliance (conventionally found in sockets) rides between the lower flanges of the latch members 458, 459 and the panel 411. It is not necessary to handle the spring 460 separately from the lamp, since, once engaged with the lamp, it will not fall off. If desired, however, the lower end of one or both latch members may be bent as at 459 around the bottom turn of the spring 460.

It will be obvious that the usefulness of my invention is not limited to automotive vehicular lighting. Among many other applications are included instrument panels, signals, general illumination, etc.

It will be obvious that various combinations of features I have shown can be made and that the various principles of my invention may be combined with many types of conventional lamp constructions. Various changes, modifications and combinations will become immediately obvious to those skilled in the art without departing from the true and full scope of my invention; and it is accordingly intended in the appended claims to cover such equivalents as may fall within the true scope of my invention and without the prior art. I wish it to be understood that my invention is not to be limited to the specific forms or arrangements of parts herein described or shown or specifically covered by my claims.

Therefore I claim:

1. An electric lamp comprising: a radiant energy producing device; a hermetically sealed enclosure containing said device; a radiant energy transmitting component constituting at least a part of said enclosure; and metallic wall means constituting a part of said enclosure, said wall means including at least one resilient metallic portion jutting therefrom, the resiliency thereof lying in said metallic wall means, said wall means thus being adapted to yield elastically when said means is inserted into an opening in a relatively non-compliant receptacle.

2. A lamp as in claim 1, said wall means having a generally tubular configuration.

3. A lamp as in claim 2, said resilient portion constituting an external electrical contact for said lamp.

4. A lamp as in claim 3, said lamp having a separate reflective liner, said liner being totally within and coaxial with said wall means, said liner being at least partially supported by said wall means.

5. An electric lamp comprising: a radiant energy producing device; a hermetically sealed enclosure containing said device; a radiant energy transmitting component constituting at least a part of said enclosure; and metallic wall means constituting a part of said lamp, said wall means including at least one resilient metallic portion jutting therefrom, the resiliency thereof lying in said metallic wall means, said wall means thus being adapted to yield elastically when said means is inserted into an opening in a relatively non-compliant receptacle, said wall means having a generally tubular configuration, said resilient portion constituting an external electrical contact for said lamp, said lamp having a second external electrical contact, said second contact projecting generally axially from the end thereof, said second contact having an intermediate curved portion of hard metal as a spring element, and said curved portion being susceptible to lateral elastic deflection coincident with axial elastic compression upon the application of an extraneous axial force to the tip of said contact.

6. An electric lamp comprising: a radiant energy producing device; a hermetically sealed enclosure containing said device; a radiant energy transmitting component constituting at least a part of said enclosure; and metallic wall means constituting a part of said lamp, said wall means including at least one resilient metallic portion jutting therefrom, the resiliency thereof lying in said metallic wall means, said wall means thus being adapted to yield elastically when said means is inserted into an opening in a relatively non-compliant receptacle, said wall means having a generally tubular configuration, said resilient portion constituting an external electrical contact for said lamp, and said wall means having a reentrant portion generally parallel to the axis thereof.

7. An electric lamp comprising: a radiant energy producing device; a hermetically sealed enclosure containing said device; a radiant energy transmitting component constituting at least a part of said enclosure; and metallic wall means constituting a part of said lamp, said wall means including at least one resilient metallic portion jutting therefrom, the resiliency thereof lying in said metallic wall means, said wall means thus being adapted to yield elastically when said means is inserted into an opening in a relatively non-compliant receptacle, said radiant energy producing device being of the gaseous discharge type and said wall means constituting one electrode for said device.

8. A lamp as in claim 1, said resilient portion having been aligned generally parallel with the axis of said wall means.

9. An electric lamp comprising: a radiant energy producing device; a hermetically sealed enclosure containing said device; a radiant energy transmitting component constituting at least a part of said enclosure; and metallic wall means constituting a part of said lamp, said wall means including at least one resilient metallic portion jutting therefrom, the resiliency thereof lying in said metallic wall means, said wall means thus being adapted to yield elastically when said means is inserted into an opening in a relatively non-compliant receptacle, said resilient portion having been aligned generally parallel with the axis of said wall means, said resilient portion first tapering radially outward and then radially inward, whereby, when said lamp is progressively forced into a constricting opening, said opening being smaller in area than the area of the smallest circumscribed circle that will include both said wall means and its resilient portion in their relaxed condition, the force required to effect insertion will progressively increase and then decrease.

10. A lamp as in claim 9, said wall means having a plurality of said resilient portions dispersed around the periphery thereof.

11. A lamp as in claim 10, said wall means being very thin and said resilient portion being integral therewith.

12. An electric lamp comprising: a radiant energy producing device; a hermetically sealed enclosure containing said device; a radiant energy transmitting component constituting at least a part of said enclosure; and metallic wall means constituting a part of said lamp, said wall means including at least one resilient metallic portion jutting therefrom, the resiliency thereof lying in said metallic wall means, said wall means thus being adapted to yield elastically when said means is inserted into an opening in a relatively non-compliant receptacle, said lamp having a keying projection extending laterally therefrom, said resilient portion having been biased to yield axially away from said keying projection under extraneous force applied from the direction of said keying projection.

13. A lamp as in claim 12, said resilient portion being a coiled spring.

14. An electric lamp comprising: a radiant energy producing device; a hermetically sealed enclosure containing said device; a radiant energy transmitting portion constituting at least a part of said enclosure; and generally annular metallic means constituting a part of said enclosure and having a resilient portion, said resilient portion having been adapted for holding coaction with the margin of an aperture in a relatively non-compliant receptacle.

15. An electric lamp comprising: a radiant energy producing device; a hermetically sealed enclosure containing said device; a radiant energy transmitting portion constituting at least a part of said enclosure; and a ring electrode coaxial with an inner electrode and also forming a part of said enclosure, said ring electrode having a resilient portion adapted for gripping coaction with the material adjacent an opening in a relatively rigid extraneous receptacle.

16. An electric lamp comprising: a radiant energy producing device; a hermetically sealed enclosure containing said device; a radiant energy transmitting component constituting at least a part of said enclosure; and metallic wall means constituting a part of the said enclosure, said wall means including at least one resilient metallic portion jutting therefrom, said wall means thus being adapted to yield elastically when said means is inserted into an opening in a relatively non-compliant receptacle.

17. An electric lamp comprising: a radiant energy producing device; a hermetically sealed enclosure containing said device; a radiant energy transmitting component constituting at least a part of said enclosure; and metallic wall means constituting a part of the said enclosure, said wall means including at least one resilient metallic portion jutting therefrom, said wall means thus being adapted to yield elastically when said means is inserted into an opening in a relatively non-compliant receptacle, said wall means being peripherally discontinuous and comprising at least two segmental units.

18. An electric lamp having an axis of insertion into a receptacle, said lamp comprising: a radiant energy producing device; a hermetically sealed enclosure containing said device; a radiant energy transmitting component constituting at least a portion of said enclosure; and metallic means comprising a part of said lamp, said metallic means including at least one resilient jutting portion, each said jutting portion jutting away from said axis and having at least one point of maximum jutting, each of said points lying in a single plane normal to said axis, all significant resiliency residing in said metallic means, said means thus being adapted to yield elastically when said means is inserted into an opening in a relatively non-compliant receptacle.

References Cited in the file of this patent

UNITED STATES PATENTS

| | | |
|---|---|---|
| 1,174,378 | Bacon | Mar. 7, 1916 |
| 1,988,290 | Wright | Jan. 15, 1935 |
| 2,055,649 | Bruner et al. | Sept. 29, 1936 |
| 2,134,472 | Criger et al. | Oct. 25, 1938 |
| 2,268,700 | Criger et al. | Jan. 6, 1942 |
| 2,465,084 | Greiner | Mar. 22, 1949 |